Feb. 18, 1941.　　J. C. AUTEN　　2,232,302
CLUTCH CONTROL FOR MOTOR VEHICLES
Filed Nov. 7, 1939　　2 Sheets-Sheet 1
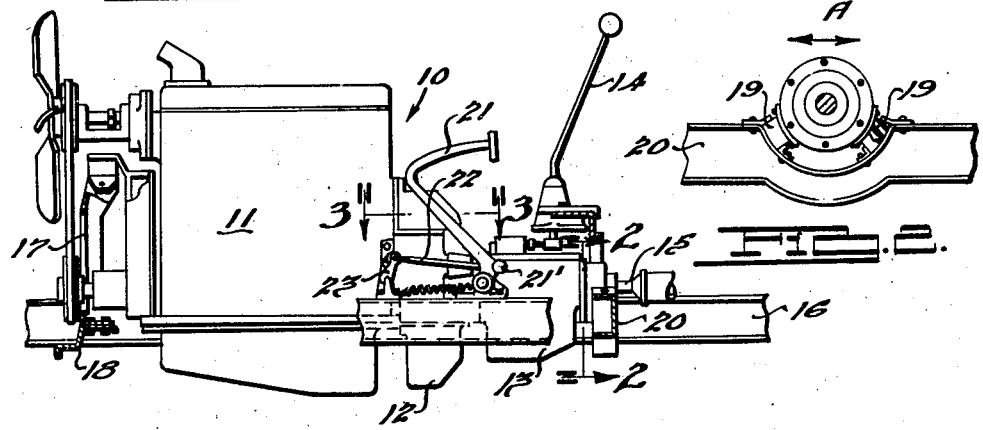
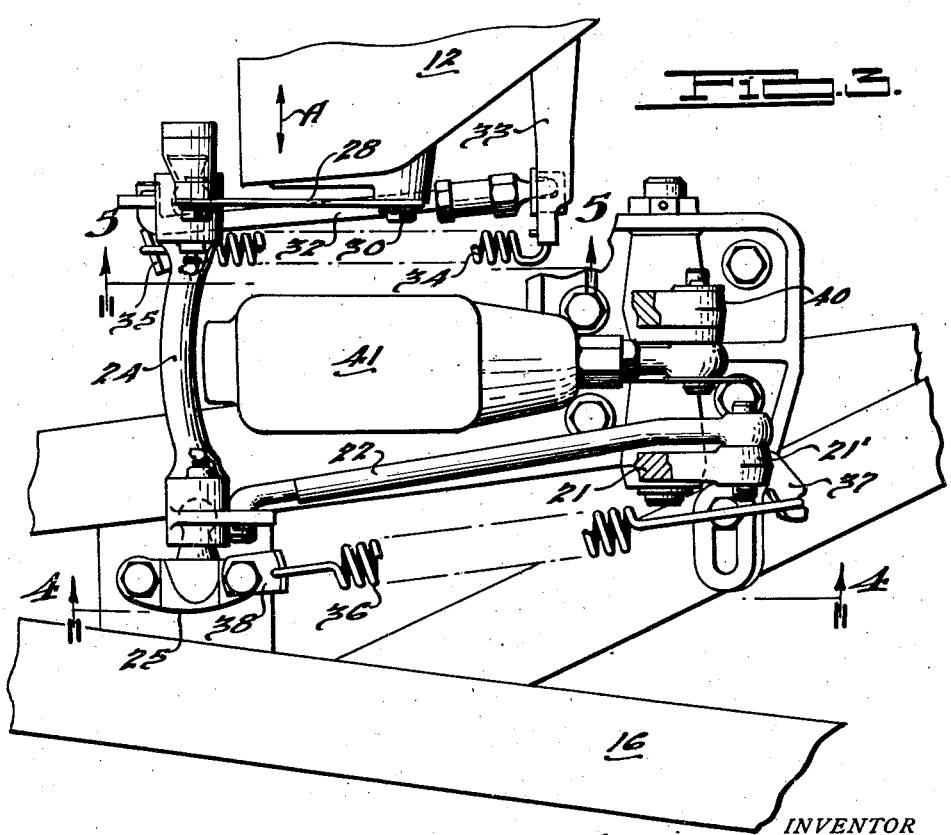
INVENTOR
Jay C. Auten.
BY
ATTORNEYS.

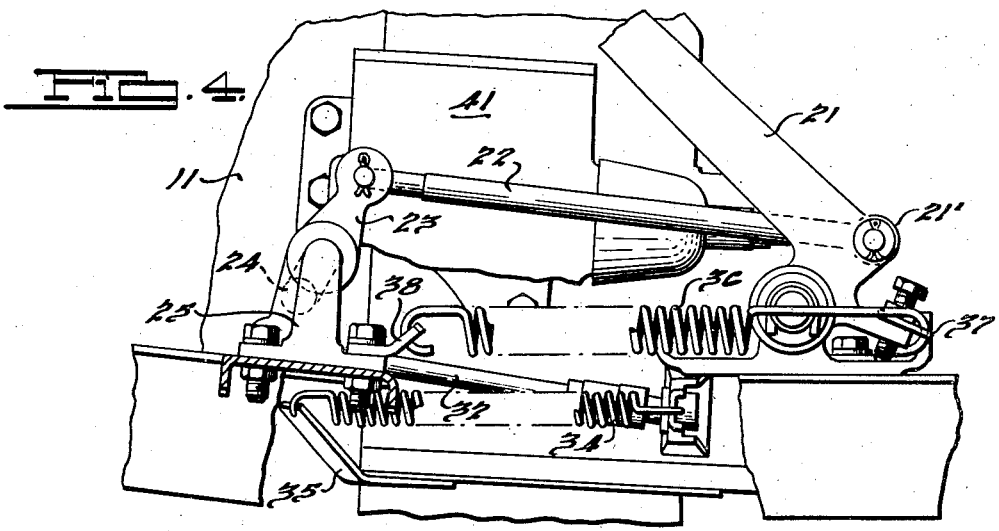
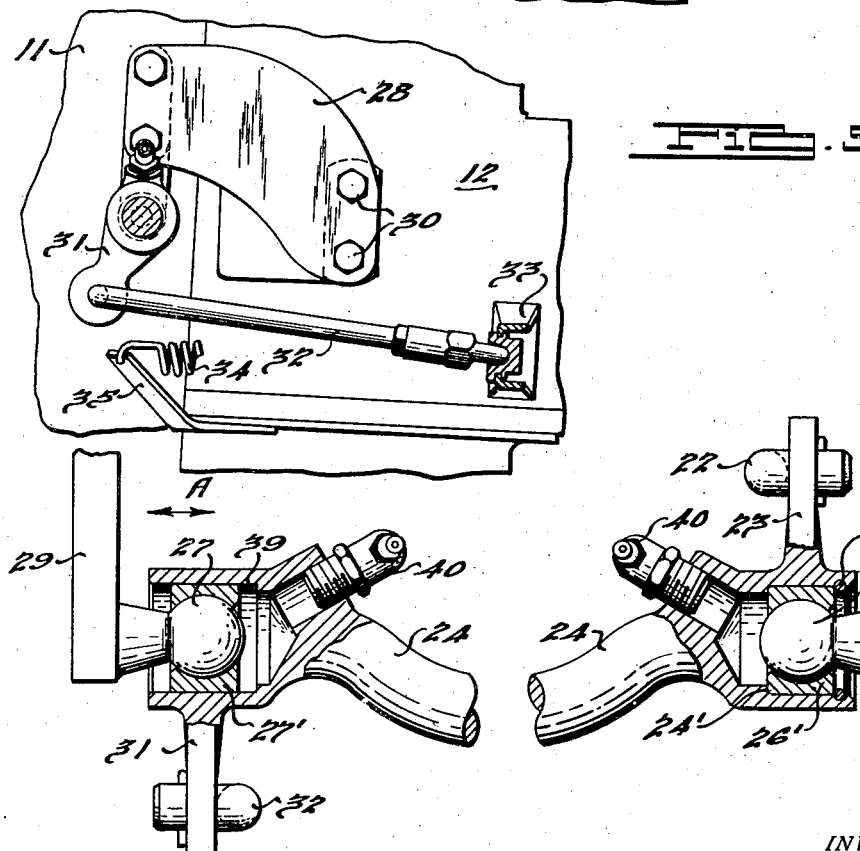

Patented Feb. 18, 1941

2,232,302

UNITED STATES PATENT OFFICE 2,232,302

CLUTCH CONTROL FOR MOTOR VEHICLES

Jay C. Auten, Royal Oak, Mich., assignor, by mesne assignments, to Cyrus B. Kurtz, Lakeside, Ohio Application November 7, 1939, Serial No. 303,262

8 Claims. (Cl. 180—64)

This application is a continuation-in-part of my earlier application, Serial No. 245,895, filed December 15, 1938.

This invention relates to an improved clutch control for motor vehicles.

More specifically, it pertains to clutch control means for controlling the operation of a motor vehicle clutch, the housing of which has appreciable vibratory movement relative to the frame of the vehicle.

For some time it has been the practice in the vehicle art to actuate the clutch release fork through a pantograph-type of linkage interposed between the fork and the driver operated foot pedal. Such a construction has been rendered necessary because of the generally universal practice of mounting the power plant of the vehicle on the frame thereof by means of resilient mountings which allow said unit to have considerable vibratory movement.

The pantograph-type linkage usually consists of a rockshaft positioned transversely of the vehicle frame on one side thereof and having oppositely extending crank arms at its respectively opposite ends. One of the crank arms is connected to the driver operated clutch pedal through a compression strut and the other crank arm is connected to the clutch fork shifter lever through a second compression strut. By the use of ball joints for supporting the aforesaid rockshaft in connection with such a linkage arrangement, it is possible to avoid undesired movement of the clutch pedal and of the clutch release fork when the engine and clutch as a unit move in any direction relative to the vehicle frame.

Heretofore, it has been the practice in the art to support the aforesaid rockshaft at one end on the vehicle frame by means of a ball and socket joint and at its other end on the power plant by means of another ball and socket joint, one of said sockets, and preferably the latter, being capable of sliding movement axially relative to the rockshaft whereby the movement of the power plant on its flexible mountings is accommodated. This arrangement has proven unsatisfactory in a great many instances because of the tendency of the relatively slidable surfaces in the slidable joint to "seize" when torque is imposed on the rockshaft, as is the case when the clutch is released.

A further object of the invention is to provide an improved linkage for actuating the clutch shifter fork whereby said fork may be effectively controlled.

Another object of the invention is to provide a linkage which will accomplish the last named object with a high degree of quietness of operation.

Still another object of the invention is to provide an improved mounting for an engine clutch control linkage allowing bodily yielding of the engine and clutch as a unit with respect to said linkage.

In the accompanying drawings which illustrate a specific embodiment of the invention and in which like reference numerals indicate like parts in the following description:

Fig. 1 is a side elevation of a motor vehicle power unit mounted on a chassis frame, certain parts being shown in section for the sake of clarity.

Fig. 2 is a section along line 2—2 of Fig. 1.

Fig. 3 is a view, on an enlarged scale, along line 3—3 of Fig. 1.

Fig. 4 is a view along line 4—4 of Fig. 3.

Fig. 5 is a view along line 5—5 of Fig. 3.

Fig. 6 is an enlarged view, partly in section, of the rockshaft and supporting joints.

The vehicle power plant, generally designated by the numeral 10 consists of a motor 11, a flywheel and clutch housed in casing 12 and a change speed gear set housing in casing 13. The gear set is manipulated by the usual shift lever 14 and power is transmitted to the rear wheels (not shown) of the vehicle by the usual transmission tail shaft 15.

The pedal 40 is connected with a piston (not shown) which reciprocates in the master cylinder 41 to effect operation of the vehicle hydraulic brakes as is well known in the art.

The power plant is resiliently mounted on the vehicle chassis frame 16 at the front by a pedestal 17 carried by a front cross member 18 and at the rear by a pair of rubber biscuits 19 carried by the rear cross member 20. The pedestal 17 supports the power unit at a point above its center of gravity by a rubber connection (not shown) so that the entire unit is free to vibrate slightly about an axis that is inclined downwardly toward the rear of the vehicle and also up and down and fore and aft to a limited extent.

The foot operated clutch pedal 21 has a crank portion 21' which is interconnected with a crank arm 23 carried by the transversely disposed rockshaft 24 by a compression strut or rod 22. The rockshaft 24 is journaled at its outer end on a frame mounted bracket 25 by means of a ball 26, and at its inner end to the power unit 10 by means of a ball 27 carried by an extension 29 of a leaf spring reaction member 28 which is in turn fastened to the motor block by fasteners 30.

The ball 26 engages a socket 26' which is retained against movement axially of the rockshaft 24 by the shoulder 24' and the snap ring 25'. The ball 27, on the other hand, engages a socket 27' which is free to slide in the bore 39 of the rockshaft.

The shaft 24 carries at its inner end a crank arm 31 which projects in a direction substantially opposite to that of crank arm 23, and which is connected to the clutch shifter fork lever 33 by the compression strut or rod 32.

A pair of grease nipples 40, of suitable form, are provided for greasing the ball joints.

It can thus be seen that forward movement of the pedal 21 will effect a corresponding rearward movement of the clutch shifter fork lever 33 through the intermediary of rod 22, shaft 24 and rod 32. The usual clutch pedal return spring 34 is connected between the shifter fork lever 33 and the power unit mounted bracket 35; and an over-center spring 36 is interconnected between the extension 37 of the pedal 21 and the tab 38 carried by the bracket 25. The over-center spring 36 is arranged to retain the pedal 21 in its illustrated rearward position, but is also effective in partially overcoming the force of the return spring 34 after initial forward movement of the pedal 21 as is more clearly shown in Fig. 4. Such an arrangement provides positive operation of the clutch with a minimum amount of effort on the part of the driver.

The rubber mountings 19 (see Fig. 2) allow the rear end of the power plant to vibrate slightly in all directions. It has been found that a substantial component of movement thereof is in the direction of the arrows A in Figs. 2 and 3, and it is this transverse vibratory movement that gives rise to the aforesaid "seizing" of the slidable socket member, in this case the member 27'.

As can be seen from Fig. 6, movement of the power plant in the direction of the arrow A is accommodated by sliding of the socket 27' in the bore 39 of the rockshaft 24, the socket 27' being free to slide so long as there is no torque on the rockshaft. Depression of the pedal 21 to release the clutch loads the rockshaft and at times causes the socket 27' to bind in the bore 39. It is under these conditions that the spring steel member 28 functions to accommodate the power plant movement. In other words, during the period in which there is no load on the rockshaft, the transverse vibratory movement of the power plant is accommodated by sliding action of the socket 27', and during the period in which the rockshaft is loaded, the power plant movement is accommodated by flexing of the reaction member 28 if the socket 27' tends to bind. It may thus be seen that provision is made for accommodating the power plant movement under all conditions of operation and a quiet, smooth-operating and durable clutch control linkage is thereby provided.

The geometry of the clutch release system is, for all practicable purposes, the same whether the ball 27 is directly mounted on the engine or through the spring bracket 28, because of the very small degree of flexing in the spring bracket when the ball socket 27' tends to seize under the conditions referred to above. Therefore by reason of the invention, I am enabled to preserve the desired pantograph action of the clutch release mechanism referred to as commonly used heretofore while eliminating the objectionable noise incident to the sliding action at the ball socket 27'.

If desired, the socket 27' may be secured against sliding movement at all times in a manner similar to that used for securing the socket 26' and the vibratory movement of the power plant may be accommodated by flexing of the reaction member 28 under all conditions. The preferred arrangement, however, is, as illustrated, the relative movement between the rockshaft 24 and the socket 27' compensating for differences in dimensions due to manufacturing tolerances and acting to relieve the spring member 28 from continuous flexing during operation of the power plant which might cause breakage after a time.

It is to be understood that while only one specific embodiment of the invention has been illustrated and described, it is not the intention to limit the scope or form thereof except as hereinafter defined in the claims appended hereto.

I claim:

1. In a motor vehicle having a frame and a power plant including a clutch movably mounted in said frame; a pedal on said frame; a clutch actuating lever on said power plant; means operably connecting said pedal with said lever including a rockshaft supported at one end on said frame; and means for supporting the other end thereof on said power plant including a member resiliently carried by said power plant and slidably connected to said rockshaft.

2. In a motor vehicle having a frame and a power plant including a clutch movably mounted in said frame, a pedal on said frame; a clutch actuating lever on said power plant; means operably connecting said pedal with said lever including a rockshaft supported at one end on said frame; and means for supporting the other end of said rockshaft including a member carried by said power plant for movement relative thereto axially of said rockshaft and means slidably connecting said member with said rockshaft.

3. In a motor vehicle having a frame and a power plant including a clutch movably mounted in said frame, a pedal on said frame; a clutch actuating lever on said power plant; means operably connecting said pedal with said lever including a rockshaft; means for supporting said rockshaft at one end on said frame comprising a ball carried by the frame and a mating socket carried by the rockshaft and engaging said ball; means for supporting the other end of said rockshaft on said power plant comprising a ball carried by the power plant for movement relative to the power plant axially of the rockshaft, and a mating socket carried by the rockshaft and engaging said ball.

4. In a motor vehicle having a frame and a power plant including a clutch movably mounted in said frame, a pedal on said frame; a clutch actuating lever on said power plant; means operably connecting said pedal with said lever including a rockshaft; means for supporting said rockshaft at one end on said frame comprising a ball carried by the frame and a mating socket carried by the rockshaft and engaging said ball; means for supporting the other end of said rockshaft on said power plant comprising a ball carried by the power plant for movement relative to the power plant axially of the rockshaft, and a mating socket carried by the rockshaft and engaging said ball; said latter socket being slidable relative to said rockshaft.

5. In a motor vehicle having a frame and a power plant including a clutch movably mounted in said frame, a pedal on said frame; a clutch actuating lever on said power plant; means operably connecting said pedal with said lever including a rockshaft; means for supporting said rockshaft at one end on said frame comprising a ball carried by the frame and a mating socket carried by the rockshaft and engaging said ball; means for supporting the other end of said rockshaft on said power plant comprising a ball carried by the power plant for movement relative to the power plant axially of the rockshaft, and a mating socket carried by the rockshaft and engaging said ball; at least one of said sockets being slidable relative to said rockshaft.

6. In a motor vehicle having a frame and a power plant including a clutch movably mounted in said frame, a pedal on said frame; a clutch actuating lever on said power plant; means for transmitting force between said pedal and lever including a rockshaft supported at its ends on said frame and power plant respectively; said supporting means including a reaction member having one end fixed to the power plant and yieldable relative to said power plant in the axial direction of said rockshaft, but rigid relative to said power plant in the direction of force transmission thereof.

7. In a motor vehicle having a frame and a power plant including a clutch movably mounted in said frame, a pedal on said frame; a clutch actuating lever on said power plant; means for transmitting force between said pedal and lever including a rockshaft supported at its ends on said frame and power plant respectively; said supporting means including a reaction member carried by said power plant and yieldable relative thereto axially of said rockshaft and means connecting said reaction member to said rockshaft yieldable axially relative to said rockshaft.

8. In a motor vehicle having a frame and a power plant including a clutch movably mounted in said frame, a pedal on said frame; a clutch actuating lever on said power plant; means operably connecting said pedal with said lever including a rockshaft; ball members supported on said frame and power plant respectively; socket members carried by said rockshaft for receiving said ball members to thereby support said rockshaft; and means for accommodating the movement of said power plant comprising means for mounting one of said ball members for movement relative to said rockshaft and to its support respectively.

JAY C. AUTEN.